(12) United States Patent
Klingel

(10) Patent No.: US 6,973,787 B2
(45) Date of Patent: Dec. 13, 2005

(54) MOTOR BRAKE DEVICE FOR A TURBOCHARGED INTERNAL COMBUSTION ENGINE

(75) Inventor: Dieter Klingel, Kirchheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/606,974

(22) Filed: Jun. 26, 2003

(65) Prior Publication Data
US 2004/0134193 A1    Jul. 15, 2004

(30) Foreign Application Priority Data
Jun. 26, 2002   (EP) .................... 02014242

(51) Int. Cl.⁷ .......................... F02D 9/06; F02B 37/00; F02B 33/44; F02M 25/07
(52) U.S. Cl. ...................... 60/612; 60/605.2
(58) Field of Search .................. 60/612, 602, 624, 60/605.2; F02D 9/06; F02B 37/00; F02M 25/07

(56) References Cited

U.S. PATENT DOCUMENTS

| | | | |
|---|---|---|---|
| 4,096,697 A * | 6/1978 | Treuil ............................ | 60/602 |
| 5,884,482 A * | 3/1999 | Lange et al. ................... | 60/624 |
| 6,378,308 B1 * | 4/2002 | Pfluger ......................... | 60/612 |

FOREIGN PATENT DOCUMENTS

| | | | | |
|---|---|---|---|---|
| DE | 4024572 A1 | * | 2/1992 | ........... F02B 37/00 |
| DE | 19837978 A1 | * | 11/1999 | |
| DE | 19853127 A1 | * | 5/2000 | ............. F02D 9/06 |
| DE | 19853360 A1 | * | 5/2000 | ............. F02D 9/06 |
| DE | 19931009 A1 | * | 2/2001 | ............. F02D 9/06 |
| EP | 864737 A1 | * | 9/1998 | ............. F02D 9/06 |
| JP | 59082526 A | * | 5/1984 | ........... F02B 37/00 |
| JP | 01182533 A | * | 7/1989 | ............. F02D 9/06 |
| JP | 04017714 A | * | 1/1992 | ........... F02B 37/00 |
| JP | 07279777 A | * | 10/1995 | .......... F02M 25/07 |

* cited by examiner

Primary Examiner—Thai-Ba Trieu
(74) Attorney, Agent, or Firm—Pendorf & Cutliff; Greg Dziegielewski

(57) ABSTRACT

Motor brake device for a turbocharged internal combustion engine with an at least two-stage charge system, which includes at least one high-pressure stage as well as at least one low-pressure stage connected on the exhaust gas side downstream of the high-pressure stage and on the charge air side is provided upstream, with at least one exhaust gas line connected with the outlet channels of the internal combustion engine and connected downstream of the internal combustion engine, with at least one first closing body, which is provided in an area of the exhaust gas line downstream of the high-pressure stage and/or the low-pressure stage, wherein the first closing body is constructed in such a manner, that the exhaust gas flow-through and thereby the pressure in the exhaust gas line dependent therefrom is variable in such a manner, that thereby the motor brake power can be variably adjusted as required.

14 Claims, 6 Drawing Sheets

MOTOR BRAKE DEVICE FOR A TURBOCHARGED INTERNAL COMBUSTION ENGINE

BACKGROUND OF THE INVENTION

1. Field of the Invention

The invention concerns a motor brake device for a turbocharged internal combustion engine, a process for operating the motor brake device as well as an internal combustion engine with such a motor brake device.

2. Description of the Related Art

In the area of turbocharged internal combustion engines it is known that in addition to the motor brake of the internal combustion engine the turbocharger may also be provided with its own brake assist device. In a typical manner of operation such a brake assist device always brings about a transformation of the turbocharger from a power output or drive device to a brake device when a brake assist process is necessary. This generally occurs by modification of the exhaust and/or suction side control of the turbocharger in such a manner that a movement of the cylinder pistons is changed from a low as possible power output loss to a large as possible power output loss and namely then when the braking of the turbocharger occurs. Such an absorption of power is based on the principle of an air compressor, that is, the cylinder pistons perform work on the air contained within the cylinders of the motor when braking is necessary.

Here there exist two fundamentally different concepts by which a brake assist for the internal combustion engine can be realized with the aid of the turbocharger:

According to a first process it is attempted, by reducing the effective cross-section of the exhaust gas side, to increase the pressure in the exhaust pipe, in order to thereby create a so-called counter pressure or back pressure, which is transmitted to the gas in the cylinder volume of the internal combustion engine. On the basis of the higher pressure in the cylinder internal space the cylinder pistons must perform a greater amount of work, which leads to braking. In practice this is carried about in various ways:

In DE 195 43 190 A1 a brake assist device for a charged internal combustion engine is described, which includes an exhaust gas turbocharger with variably adjustable turbine geometry via adjustable guide vanes. The channeling means include guide vanes, which can be so adjusted with the aid of an adjusting mechanism, that the effective, that is, the useful turbine cross-section of the turbine geometry, is changed. Thereby, depending upon operating condition of the internal combustion engine, various elevated exhaust gas pressures can be realized in the segment between the cylinders and the turbocharger, whereby the output of the turbine and the output of the compressor can be adjusted according to need.

In order to cause a motor braking during operation of the internal combustion engine, this array of guide vanes is brought into a constriction orientation in such a manner that the effective turbine cross-section is significantly reduced. In a guide vane assembly segment between the cylinders and the turbine a high exhaust gas pressure builds up with the consequence that exhaust gas flows with high velocity through the channels between the guide vanes of the turbine and impact the turbine wheel with a high impulse. The turbine output is transmitted to the compressor, whereupon the charge air supply to the motor is placed under elevated charge pressure by the compressor. Thereby the cylinder on the charge air side is acted upon with increased charge air, at the exhaust gas side there is an elevated exhaust gas pressure between the cylinder outlet and the turbocharger, which counter acts the output of the air compressed in the cylinders by opened brake valves in the exhaust pipe segment. In the motor braking operation the piston must perform increased compression work against the high overpressure in the exhaust line, whereby depending upon the positioning of the guide vanes a more or less strong braking effect is achieved.

Supplementally or alternatively thereto turbines provided with guide vanes can also have a flap valve, which is provided in the exhaust gas line downstream of the turbine. This flap can be pivoted perpendicular or substantially perpendicular to the exhaust gas line in the braking operation of the motor brake device and reduces thereby the effective cross-section in the exhaust gas line, whereby upstream in the direction of the cylinder outlet the pressure in the exhaust gas line increases and therewith a braking effect is achieved. A turbocharger with such a flap is described for example in DE 40 24 572.

According to a second concept an exhaust gas return line can be provided for elevating the motor brake effectiveness, which is activated during the motor braking operation. Therein exhaust gas out of the exhaust pipe which during the motor braking operation includes various amounts of uncombusted exhaust gas air and which due to compression in the cylinders has an elevated temperature level, is supplied again to the cylinders of the internal combustion engine.

In DE 198 53 127 A1 such a motor brake device with exhaust gas recirculation is described. There the exhaust gas is branched off prior to the turbocharger, is directed in the direction of the cylinder inlets, and is mixed together with the combustion air compressed in the compressor of the turbocharger and supplied to the cylinders. A back-flow valve is provided in the line for exhaust gas recirculation. This back flow valve is necessary here in order to balance out pressure differentials between the exhaust gas line and the charge air line.

All of the above mentioned brake assist devices of a turbocharged internal combustion engine are however designed only for so-called single stage turbochargers. Modern turbochargers can however have a two stage charge system.

An internal combustion engine equipped with such a two-stage charge system is described for example in German patent publication DE 198 37 978 A1 and DE 195 14 572 A1. In such a two-stage charged internal combustion engine the set of turbochargers respectively includes one high-pressure stage and one low-pressure stage arranged in sequence to each other. The exhaust gas leaving the motor first flows through the high-pressure turbine and subsequently the low-pressure turbine. In the same manner the charge air for supplying the cylinders is first compressed by a low-pressure compressor and subsequently by a high-pressure compressor and supplied to the charge air side of the internal combustion engine, in certain cases following cooling of the charge air in a heat exchanger. In a typical mode of operation the turbocharger during low RPM of the internal combustion engine is operated in two stages. As the RPM increases operation can be switched to the single low pressure compressor, wherein for example by means of an exhaust gas sided bypass line the high pressure turbine can be completely or at least partially bridged over or bypassed. In this case the high-pressure compressor could also be completely bypassed via a pipe switch or valve provided in the charge air side.

In such a two-stage turbocharger the turbines and compressors respectively arranged in series are designed for different charge pressures. In practice this has the consequence, that very large constructive expenditure is necessary for realizing the above-mentioned brake assist device. In order for example to obtain one optimal brake assist module for each of the respective different modes of operation of the two-stage turbocharger, a large number of pipe switches indispensable in order respectively to achieve the desired pressures in the exhaust pipes and charge air lines. Such brake devices are thus very expensive in their manufacture, wherein however the increased expenditure does not bring about an improvement in braking quality. In particular in the case of very small turbochargers, which are employed primarily in internal combustion engines with very small engine compartments, such a brake assist device has not been provided in satisfactory manner until now.

SUMMARY OF THE INVENTION

The present invention is thus concerned with the task of providing a improved braking device for a two-stage turbocharger of an internal combustion engine.

In accordance with the invention this task is solved by an internal combustion engine, a process for operating the brake device, and an internal combustion engine as described in greater detail in the following.

In accordance therewith there is provided:

A motor brake device for a turbocharged internal combustion engine, with an at least two-stage charge system, which includes at least one high pressure stage as well as at least one low pressure stage downstream in the direction of the exhaust of the high-pressure stage and/or the low-pressure stage, and upstream in the direction of the charge air side, with at least one exhaust pipe provided downstream of the internal combustion engine and connected with the outlet channels of the internal combustion engine, with at least one closing or blocking body, which is provided in the exhaust pipe downstream of the low-pressure stage relative to the direction of flow of the exhaust gas, wherein the closing body is of such a design, that the exhaust gas flow-through, and the pressure in the exhaust line dependent thereon, is changeable in such a manner that thereby the motor braking power is variably adjustable as needed.

A process for operating a motor brake device for a turbocharged internal combustion engine, which by means of a control device adjusts the value of a first pressure in the exhaust pipe upstream of the high-pressure turbine depending upon the braking mode.

An internal combustion engine with a motor block, which includes at least one cylinder and includes at least one charge air inlet and at least one exhaust gas outlet, with a charge system capable of functioning as a braking device.

Advantageous embodiments and further developments of the invention can be seen in the dependent claims as well as the figures and associated text.

BRIEF DESCRIPTION OF THE DRAWINGS

The invention is in the following described in greater detail on the basis of the embodiments shown in the figures. There is shown.

DETAILED DESCRIPTION OF THE INVENTION

In all figures the same or, as the case may be, functionally equivalent elements—insofar as not otherwise indicated—are provided with the same reference numbers. In all figures the direction of the exhaust gas flow as well as the charge air flow are respectively shown by arrows in the appropriate lines.

Figure 1:
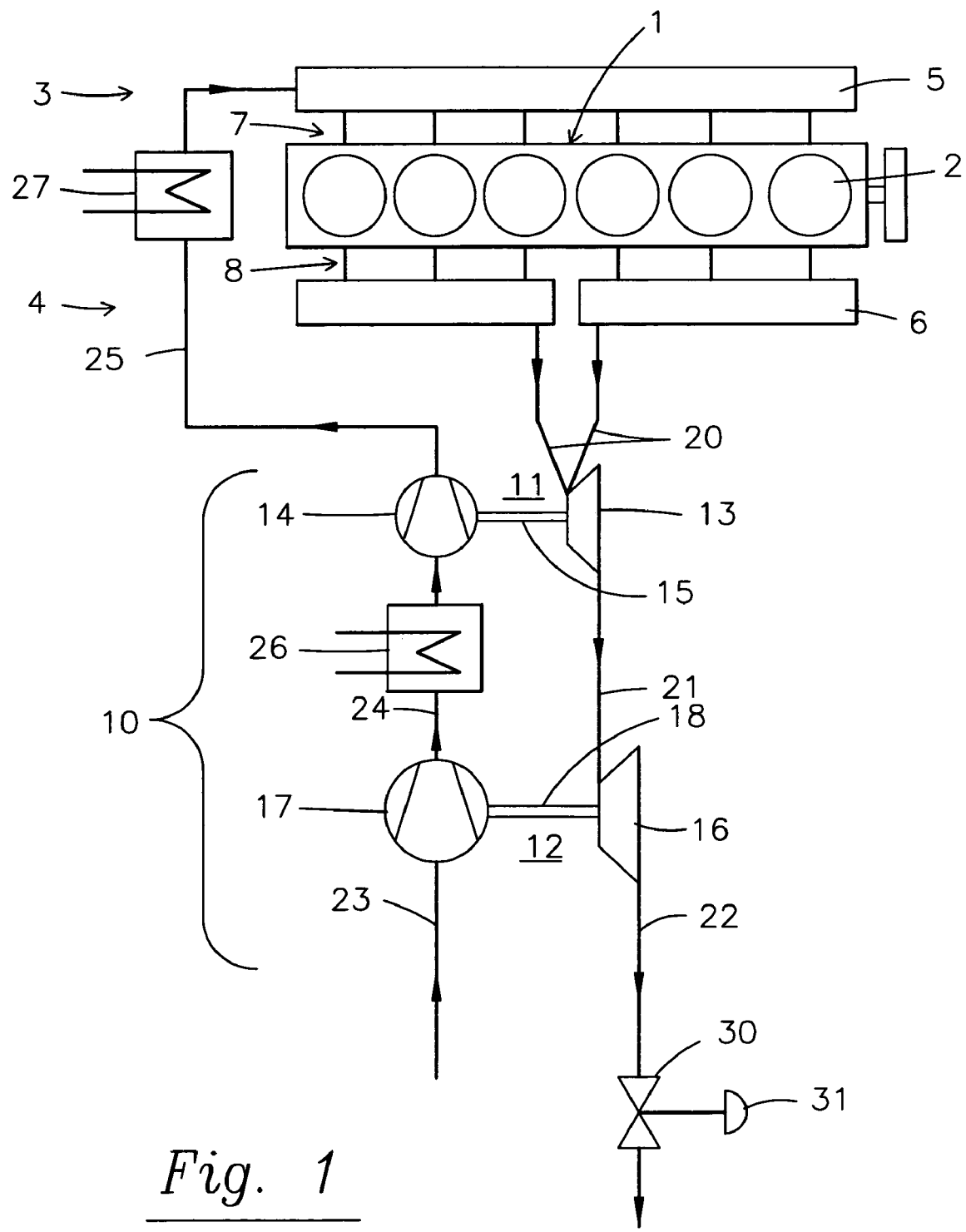
FIG. 1 a first embodiment of an inventive two-stage charged internal combustion engine with regulating or control valve in the exhaust gas manifold in schematic representation.

FIG. 1 shows in a schematic representation a first embodiment of an inventive braking device.

In FIG. 1 an internal combustion engine is indicated with reference number 1. In the illustrated example the internal combustion engine 1 is in the form of a straight six-cylinder diesel internal combustion engine and thus comprises six cylinders 2 arranged in a row. The internal combustion engine 1 includes a fresh air side 3 and exhaust side 4, wherein the inlets 7 on the fresh air side 3 are connected with a charge air collector 5 and the outlets 8 of the internal combustion engine 1 on the exhaust gas side 4 are connected with two exhaust gas collectors or manifolds 6.

The internal combustion engine 1 is charged via a turbocharger indicated with reference number 10. In the illustrated embodiment the turbocharger 10 is a two-stage turbocharger. Such a two-stage turbocharger 10 includes a high-pressure stage 11 and a low-pressure stage 12. The high-pressure stage 11 is comprised of a high-pressure turbine 13 and a high-pressure compressor 14, which are rigidly connected with each other via a common shaft 15. The low-pressure stage 12 is comprised of a low-pressure turbine 16 and a low-pressure compressor 17, which likewise are connected with each via a common shaft 18. The high-pressure stage 11 is upstream of the low-pressure stage 12.

The diameter of the turbine wheel of the low-pressure turbine 16 is in the present case greater than that of the high-pressure turbine 13, wherein the turbine wheel diameter relationship between low-pressure and high-pressure turbines typically but not necessarily is in the range of 1.2–1.8. In the same manner the compressor wheel of the high-pressure compressor 14 has a smaller diameter than the compressor wheel of the low-pressure compressor 17.

The exhaust line 6 is connected in the upstream direction with exhaust gas lines 20, 21, 22, via which the exhaust gas can be channel out of the cylinders 2 of the internal combustion engine 1. In the same manner charge air lines 23, 24, 25 are provided, which are connected upstream with the charge air collector 5. Charge air can be supplied to the cylinders 2 of the internal combustion engine via the charge air lines 23, 24, 25 and the compressor 14, 17.

The two turbines 13, 16 are arranged sequentially, wherein the high-pressure turbine 13 is connected with the low-pressure turbine 16 via the exhaust gas line 21 and upstream of the low-pressure turbine 16 with respect to the direction of flow of the exhaust gas. In the same manner the low-pressure compressor 17 and the high-pressure compressor 14 are arranged sequentially and connected with each other via a charge air line 24, wherein the low-pressure compressor 17 is provided upstream of the high-pressure compressor 14 with respect to the direction of flow of the charge air.

Further, a first charge air cooler 26 is provided, which is located in the charge air line 24 between the two compressors 14, 17. A second charge air cooler 27 is provided in the charge air line 25 between the high-pressure compressor 14 and inlets 17 of the internal combustion engine 1. If necessary one or, in extreme cases, both charge air coolers 26, 27 can be omitted.

In accordance with the invention a variable closing device 30 for example, one first closing body, is provided, which is shown here in the form of a controllable or adjustable valve. The closing device 30 can however be a braking flap, a throttle flap, pusher or the like. The valve 30 is adjustable via an adjusting element 31 connected with the control valve 30. The closing device 30 can be made controllable or adjustable via a control or adjusting device not shown in FIG. 1. The function of such a control or adjusting device is described in the following in greater detail on the basis of FIG. 6.

Figure 2:
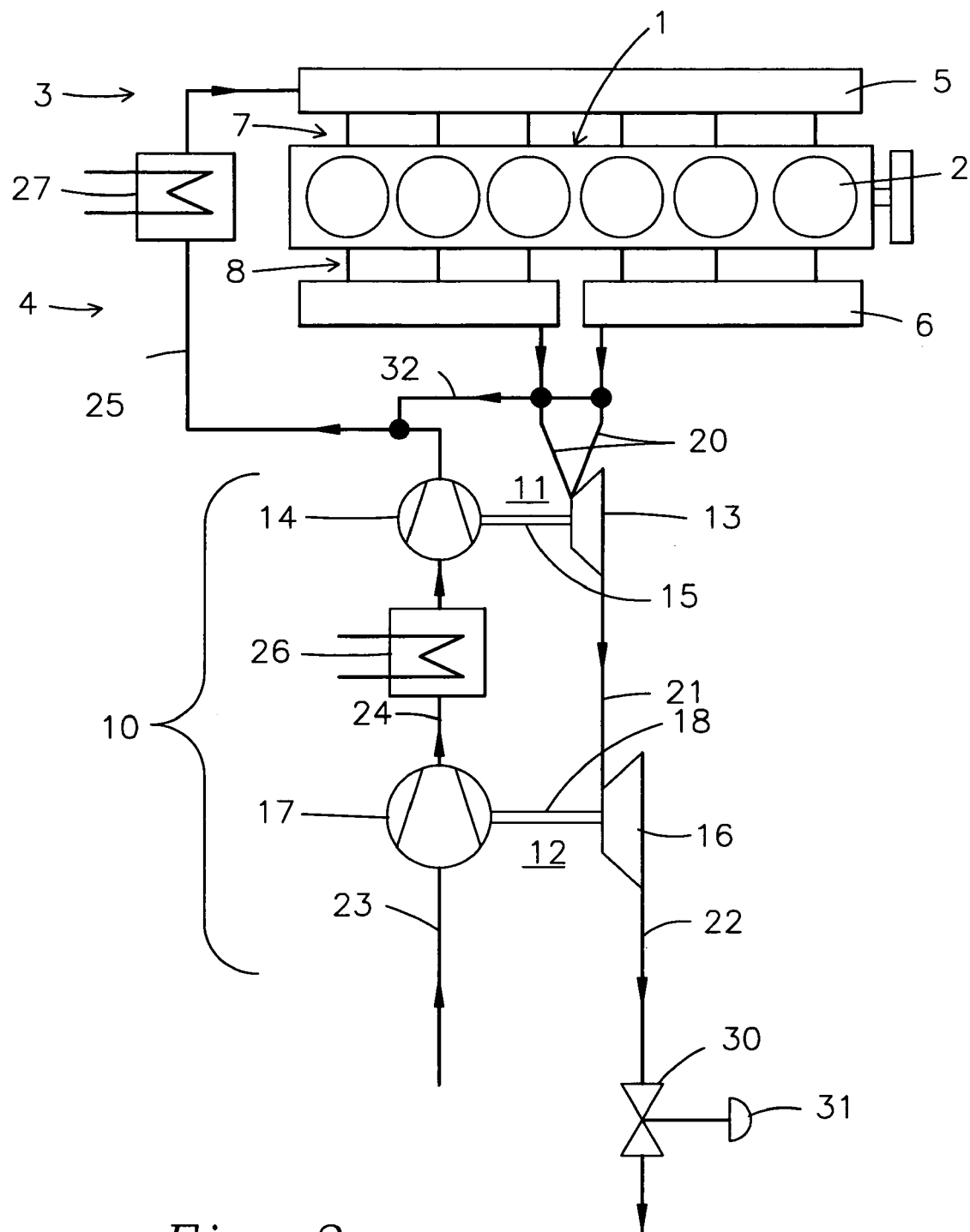
FIG. 2 a second illustrative embodiment of an inventive two-stage charged internal combustion engine according to FIG. 1 with incorporated exhaust gas recirculation line.
Figure 6:
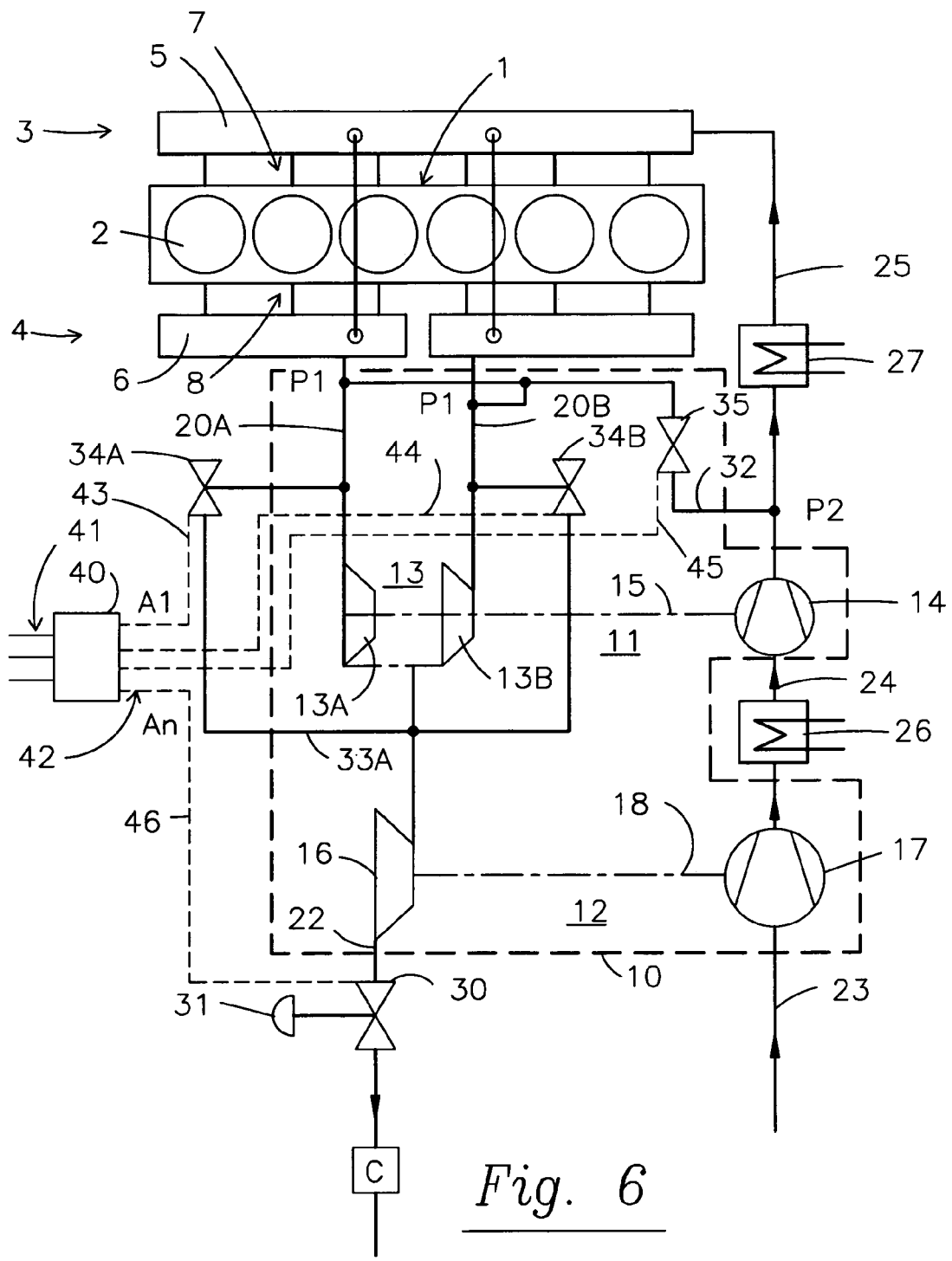
FIG. 6 a sixth particularly preferred embodiment of an inventive two-stage charged internal combustion engine in schematic representation.

In distinction to FIG. 1, the device according to FIG. 6 additionally includes an exhaust gas recirculation line 32. The exhaust gas recirculation line 32 branches from the exhaust line 20, which comes out of the exhaust collecting line 6, and branches in the charge air line 25, which connects the high-pressure compressor 14 with the charge air collector line 5. The particular advantage of the arrangement shown in FIG. 2 is comprised therein that on the basis of the pressure relationship in the exhaust lines 6, 20 as well as the charge air lines 5, 25, neither return valve nor one-way valve need be provided and beyond this, as will be described in the following, it is not even necessary.

Figure 3:
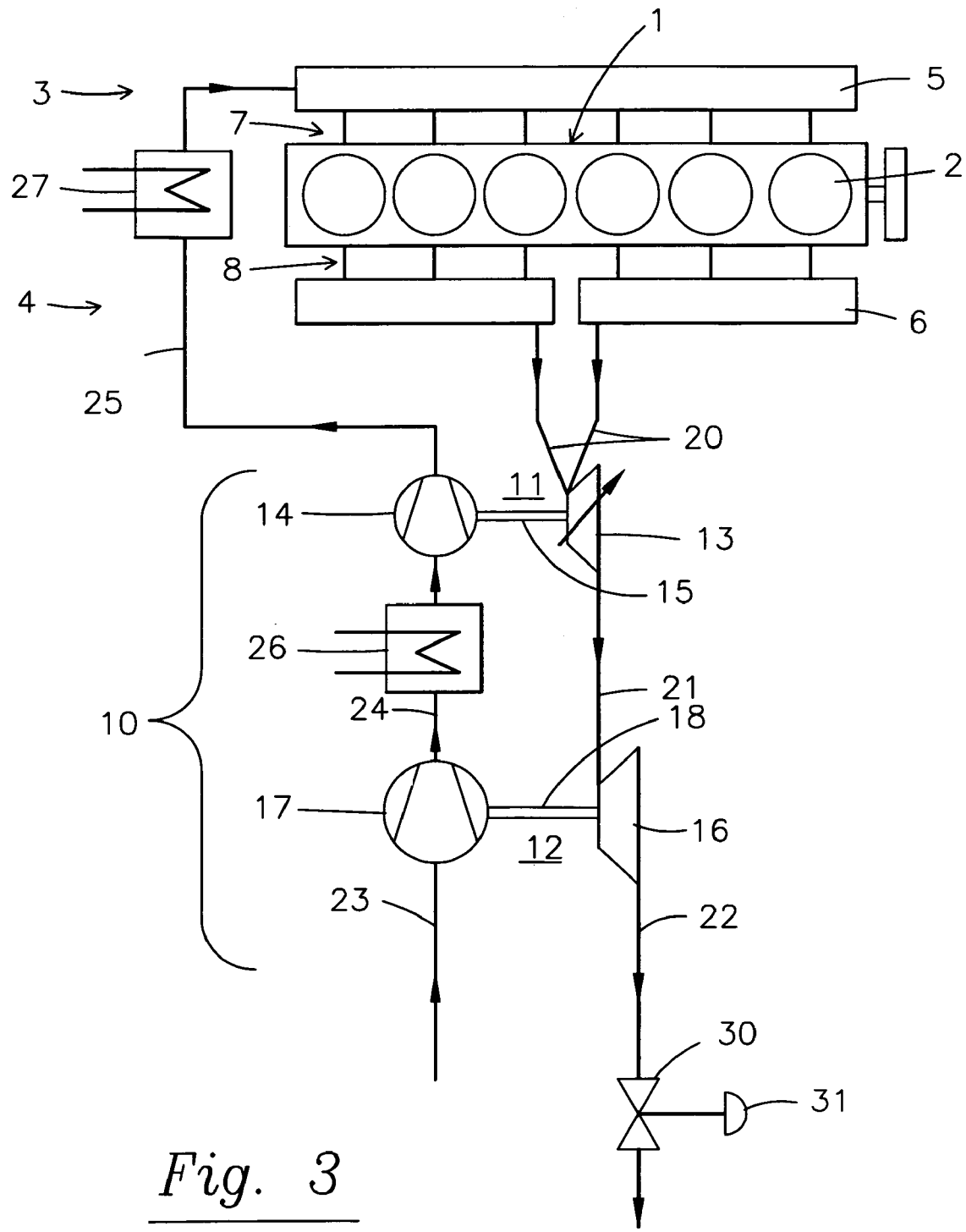
FIG. 3 a third embodiment of an inventive two-stage charged internal combustion engine according to FIG. 1 with variable turbine geometry.

In distinction to the arrangement in FIG. 1 the turbocharged internal combustion engine 1 according to FIG. 3 includes a turbocharger 10, which includes a high-pressure turbine 13 with variable turbine geometry (VTG). The functionality of a variable turbine geometry is indicated in all the figures with an arrow.

Figure 4:
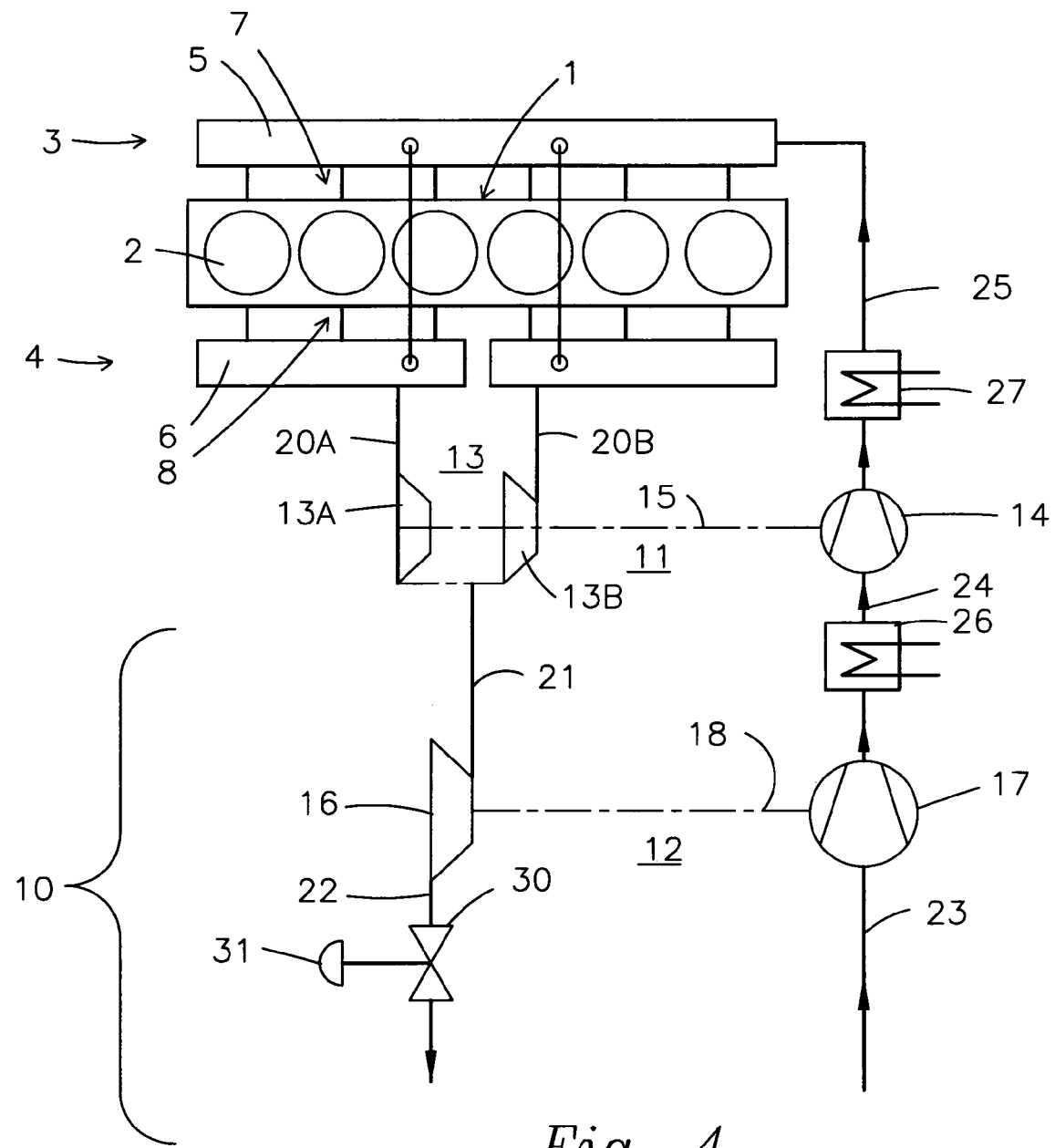
FIG. 4 a fourth embodiment of an inventive two-stage charged internal combustion engine according to FIG. 1 with a high pressure turbine in the form of a split stream or dual flow turbine.

In distinction to the arrangement according to FIG. 1, the turbocharged internal combustion engine according to FIG. 4 includes a high-pressure turbine 13 with a dual volute. This twin volute high-pressure turbine 13 is comprised of two parallel turbine wheels 13A, 13B which are connected with each other—typically rigidly. Typically, however not necessarily, these two turbine wheels 13A, 13B can have the same flow-through cross section of the turbine channels.

Figure 5:
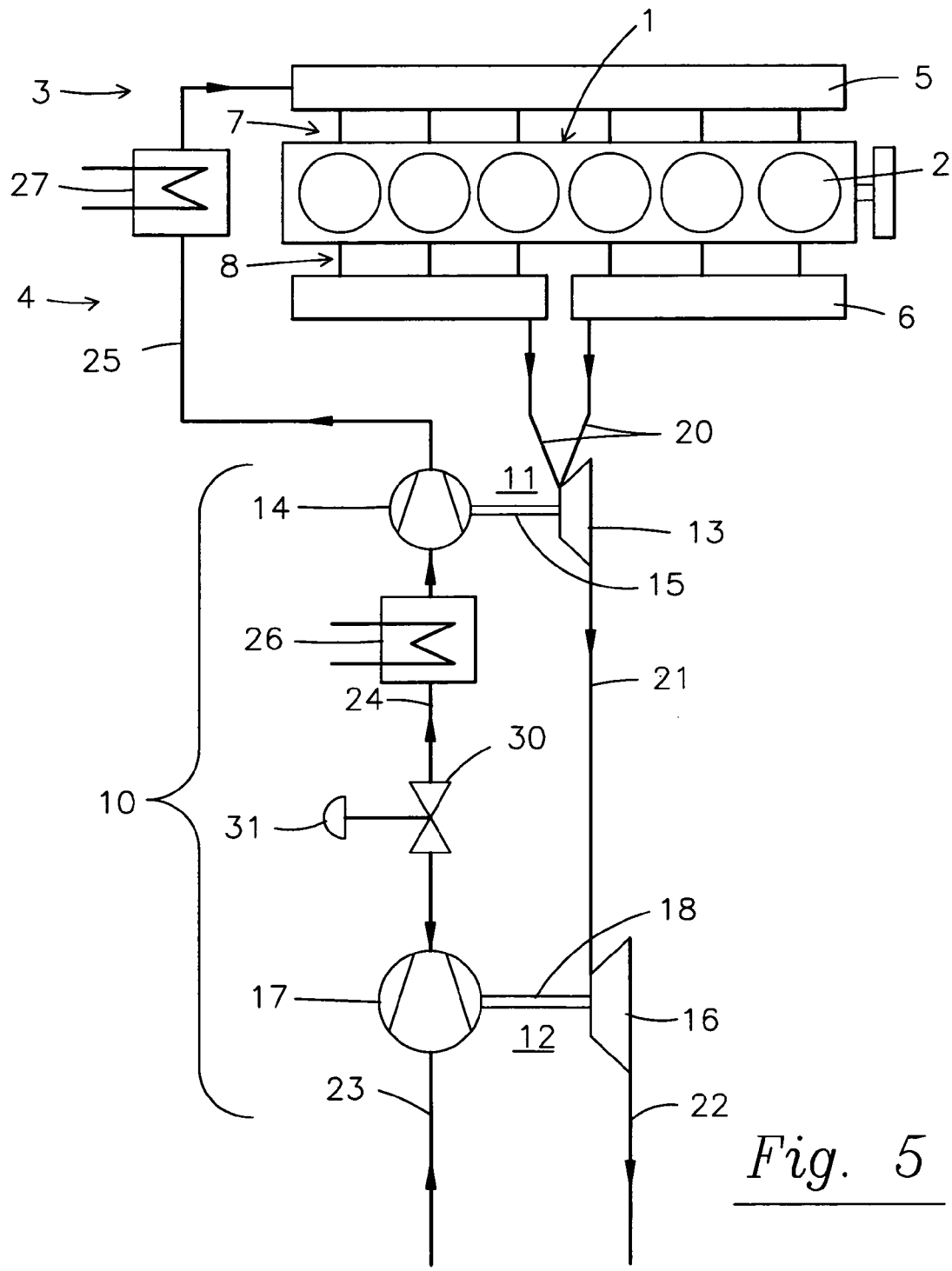
FIG. 5 a fifth embodiment of an inventive two-stage charged internal combustion engine according to FIG. 1, in which the closing body is provided between the high-pressure stage and the low-pressure stage.

In contrast to the arrangement in FIG. 1, in the fifth illustrated embodiment shown in FIG. 5 a closing device 30 is provided between the high-pressure stage and low-pressure stage 11, 12. Since the brake flap 30 acts here directly upon the high-pressure stage, this arrangement has been found, in contrast to the arrangement shown in FIG. 1, as having a higher precision and speed of control of the high-pressure stage 11.

For the optimal adaptation of the two-stage turbocharger 10 to the operating condition of the internal combustion engine 1, there is provided in each channel 13A, 13B of the two-staged twin volute pressure turbine 13 a bypass line in preferably symmetric connection. These respectively branch from the separate pipes 20A, 20B which are exhaust gas connecting pipes, circumvent the dual volute turbine 13 and interface for the same impact on the single volute low-pressure turbine 16 in the common line 21. Each bypass line 33A, 33B is provided with a second closing body as distinguished from the first closing body 30) 34A, 34B downstream of the branch, for example in the form of a pipe switch or control valve. These pipe switchs 34A, 34B are advantageously integrated into the exhaust gas connecting pipe or manifold or in the housing of the high-pressure turbine 13 and can be sliders, valves, flaps, restrictors, dampers or the like and for example can be controlled individually or collectively via a programmed unit, for example a CPU.

Preferably, however not necessarily, the turbine wheels 13A, 13B of the twin volute or twin flow high-pressure turbine 13 are operated synchronized.

FIG. 6 shows in a schematic representation a sixth, particularly preferred embodiment of an inventive two-stage charged internal combustion engine. The preferred arrangement in FIG. 6 is comprised essentially of a combination of the various components of an internal combustion engine 1 according to FIGS. 1–4. The internal combustion engine 1 is here equipped with a control valve 30, an exhaust gas return line 32, bypass lines 33A, 33B with pipe switches 34A, 34B provided thereon. In addition the high-pressure stage 11 includes a twin volute high-pressure turbine 13, which in the high-pressure turbines 13A, 13B respectively have a variable turbine geometry.

At this point it can be noted, that the low-pressure turbine 12 can of course also be in the form of a twin flow or dual volute turbine. Beyond this, additionally or alternatively, the low-pressure turbine 12 can also have variable turbine geometry.

FIG. 6 additionally shows a control device 40. The control device 40 includes data inputs 41 and data outputs 42. Via the data inputs 41 data can be input such as for example analog measurement values such as for example a temperature or the pressure of the exhaust gas or the charge air, the RPM of the motor, etc., or digital data can be input. Depending upon this data and a preprogrammed program of the control device 40 this produces controlled signals, which can be read at the outputs 42, of the control devices 40.

The data outputs 42 are connected via a plurality of control lines 43–46 with the control valves 34A, 34B, with the twin flow pressure turbine 13, with the low-pressure turbine 12 as well as with the control element 31 of the control valve 30.

Further a restrictor 35 is provided, which is located in the exhaust gas recirculation line 32. This is typically likewise adjusted or activated via the control device 40.

In addition it is possible to provide a further exhaust gas recirculation line, not shown in FIG. 6, in which a portion of the returned exhaust gas is supplied to any other point of the charge air side. Typically, however not necessarily, up to approximately 50% of the exhaust gas is returned back to the internal combustion engine 10 via the charge air side 3.

The manner of operation of a turbocharged internal combustion engine 1 is generally known and is described in detail in the references mentioned in the above introduction, so that in the following this need only be described briefly:

The six-cylinder diesel internal combustion engine 1 is charged by a two-stage turbocharger 10. For this, a twin high-pressure stage 11 is provided upstream of a single low-pressure stage 12. Charge air is compressed by the compressor 14 or as the case may be 17 driven by the twin flow turbines 13A, 13B and the low-pressure turbine 16, cooled in the two charge air coolers 26, 27, mixed in a particular proportion ($\geqq 0$) with exhaust gas from the exhaust gas recirculation line 32 and supplied to the charge air side 3 of the internal combustion engine 1.

For controlling the pipe switch 30, 33A, 33B, the closing body as well as the turbines 13, 16 which in their geometry are variable depending upon the operating values A1–An these are connected to an electronic motor control 40, for example a CPU, which ensures an optimal distribution of the exhaust gas flow for operation. By the possible adjustment of various bypass rates, flow through rates and turbine configurations one obtains in advantageous manner a supplemental degree of freedom for dividing or distributing the total exhaust gas amount, which is of particular significance for the brake assist operation of the turbocharger 10.

In the following the manner of operation of a turbocharger 10 configured as brake assist device in accordance with the invention will be described in greater detail with reference to FIG. 6:

In the case of closed bypass valves 34A, 34B and a controllable exhaust brake flap 30 an elevated motor brake power is achievable, which is made possible by an elevated exhaust gas pressure due to the small high pressure stage 11. In the case of use of various sizes of channels 13A, 13B of the high-pressure twin turbine 13 and a controlled regulation of the respective bypass valves 34A, 34B the appropriate rotational speed range for braking operation can be optimally met. The various channel diameters of the two high-pressure turbines 13A, 13B can be achieved on the basis of their variable turbine geometry by suitable control of the motor control 40. Thereby a differential distribution of the exhaust gas flow to the high and low-pressure stages 11, 12 can be divided or distributed.

This exhaust gas mass flow can be influenced as follows:
1. In the case of suitable adjustment of the control valve 30, the effective cross-section of the exhaust gas line 22 can be targetedly adjusted.
2. The high-pressure turbines 13A, 13B and preferably also the low-pressure turbine 16 exhibit a variable turbine geometry. In the case of suitable control the effective channel cross-section of the respective turbines can be selected to be greater or smaller.
3. Via the bypass valves 34A, 34B it can be adjusted which proportion of the exhaust gas flows through the high-pressure turbines 13A, 13B and which proportion bridges over or bypasses the high-pressure turbines 13A, 13B.

By the mentioned measures, that is, by suitable control and/or regulation of the just mentioned elements, there can in defined manner a pressure P1 on the exhaust gas in the exhaust gas lines 6, 20 and therewith also in the cylinders 2 be adjusted. In a particularly preferred embodiment, in particular in the case of presence of an exhaust gas recirculation line 32 according to FIG. 6, there can therewith be ensured, that the exhaust gas side pressure P1 in the exhaust gas line 20 is always greater than the charge air side pressure P2 in the charge air line 25. Since therewith a pressure drop continuously exists between the exhaust gas side and charge air side area of the exhaust gas return line 32, here advantageously there is no need for a return block valve or one-way valve in the exhaust gas recirculation line 32.

In a further advantageous embodiment, it can be ensured that the pressure P1 on the exhaust gas side is maintained constant.

In addition, by the different sizes of the channels 13A, 13B of the twin flow turbine 13 with separate control of the bypass valves 34A, 34B an optimal dosing of the recirculated exhaust gas amount (EGR-amount) to the respective desired operating condition is made possible. A supplemental EGR-valve, which is always necessary for example in the above-described state of the art, is here not necessary.

In FIG. 6 nevertheless a throttle or restrictor 35 is provided in the exhaust gas recirculation line 32, via which the exhaust gas mass flow can be supplementally dosed via the return gas line 32 with suitable control. Thereby the motor characteristics can be targetedly influenced, in that for example the motor operation values with respect to the harmful emissions ($No_x$, CO, $CO_2$) and with respect to the fuel consumption can be substantially optimally adjusted. A particular advantage of this inventive exhaust gas recirculation is comprised therein, that the exhaust gas flow is already achieved solely by the pressure drop of pressure gradient between the exhaust gas side and charge air side. Thus is it completely sufficient, to provide merely a flow through restrictor in the exhaust gas recirculation line 32, wherein however this also—as already mentioned above—can be omitted without noticeable compromise of the function of the brake assist device.

Of course, the invention is not exclusively limited to the two-stage turbocharger, but rather can be practiced with a three or more stage turbocharger.

The two turbocharger stages are, in the present embodiment, preferably components of a single turbocharger and are thus integrated into one housing of the turbocharger. However this advantageous integration of two turbocharger stages into a single turbocharger is not absolutely necessary, but rather the same function can be achieved by two separate, sequentially arranged turbochargers, although this arrangement is less preferred on the basis of the complexity of assembly and installing and the higher costs.

Finally, the invention is not exclusively limited to diesel internal combustion engines with a straight six-cylinder arrangement but rather can also be applied to various internal combustion engines with a varied number of cylinders. Further, in a conventional manner, a catalyst or catalyitic converter can be located in line with and downstream of the turbocharger.

In the present illustrated embodiment the low-pressure stage exhibits a greater diameter than the high-pressures stage with respect to the turbine wheels. However, this is not absolutely necessary, but rather it would also be conceivable, that the two turbine stages have the same turbine wheel diameter or as the case may be the high-pressure stage exhibits the higher wheel diameter.

In the present illustrated embodiment the control of the closing bodies (valves, flaps, pipe switches, etc.) as well as the turbine geometry was described on the basis of a motor control. Of course, some or all of these elements can also be controlled in other manners or using an installed control device be adapted to the desired operating conditions. The control or actuation of the closing bodies or, as the case may be, turbine geometry, can occur electrically, pneumatically, hydraulically or mechanically.

In summary it can be concluded, that by using the two-stage turbocharger as described a complete departure from previously known solutions a targeted adjustable exhaust gas side pressure, in particular a constant pressure, can be adjusted or controlled in a very simple manner, without a complex and expensive solution according to the state of the art being necessary.

The present invention was described on the basis of the above in such a manner that the principle of the invention and its practical application is described in detail, however the same invention can be realized in various other embodiments by suitable modifications.

Reference Number List
1 internal combustion engine
2 cylinder
3 charge air side
4 exhaust gas side
5 charge air collection line
6 exhaust gas collection line
7 inlet
8 outlet
10 turbocharger
11 high-pressure stage
12 low-pressure stage
13 high-pressure turbine
13A, 13B turbine wheels of the split flow high-pressure turbine, channel
14 high-pressure compressor
15 shaft
16 low-pressure turbine
17 low-pressure compressor
18 shaft
20, 20A, 20B exhaust gas line
21, 22 exhaust gas line
23, 24, 25 charge air line
26, 27 charge air cooler
30 valve
31 adjusting element
32 exhaust gas pressure line
33A, 33B bypass line
34A, 34B bypass valve, pipe switch
35 flow through restrictor
40 control device, motor control
41 data input
42 data output
43–46 control line
P1 exhaust gas side pressure
P2 charge air side pressure

What is claimed is:

1. A motor brake device for a turbocharged internal combustion engine (1),
with an at least two-stage charge system (10), which includes at least one high-pressure stage (11) as well as at least one low-pressure stage (12) connected in the exhaust gas flow downstream of the high-pressure stage (11) and upstream in the charge air flow,
with at least one exhaust gas line (20, 20A, 20B, 21, 22) connected with outlet channels (8) of the internal combustion engine (1) and connected downstream of the internal combustion engine (1),
with at least one first closing body (30), which is provided in an area of the exhaust gas line downstream of the high-pressure stage (11) and/or the low-pressure stage (12), wherein the first closing body (30) is constructed in such a manner, that the exhaust gas flow-through and thereby the thereupon dependent pressure (P1) in the at least on exhaust gas line (20, 20A, 20B, 21, 22) is so variable, that thereby the motor brake power is variably adjusted as required,
wherein an exhaust gas recirculation line (32, 35) is provided, which includes at least one exhaust gas return line (32), via which a portion of the exhaust gas is supplied from said at least one exhaust gas line (20, 20A, 20B) upstream of a turbine (13, 13A, 13B) of the high-pressure stage (11) to a charge air line (25) behind a compressor (14) of the high-pressure stage (11) to ensure that the exhaust gas side pressure (P1) in the exhaust gas line (20) is greater than the charge air side pressure (P2) in the charge air line (25) to reduce harmful emissions ($NO_x$, $CO$, $CO_2$).

2. A motor brake device according to claim 1, wherein no one-way valve is provided in the exhaust gas return line (32) and wherein a first pressure (P1) in the exhaust gas line (20, 20A, 20B) ahead of the turbine (13, 13A, 13B) is continuously greater than a second pressure (P2) in the charge air line (25) downstream of the compressor (14).

3. A motor brake device according to claim 1, wherein a flow-through restrictor (35) is provided, which is located in the exhaust gas return line (32) and via which it is determined which proportion of the exhaust gas is returned via the exhaust gas return line (32) into the charge air line (25).

4. A motor brake device according to claim 1, wherein the first closing body (30) is a control valve (30), an exhaust gas brake flap or an exhaust gas throttle valve.

5. A motor brake device according to claim 1, wherein at least one of the turbines (13, 16) is a turbine with variable geometry.

6. A motor brake device according to claim 1, wherein at least one turbine (13, 13A, 13B) of the turbocharger (10) is a twin flow turbine (13A, 132), in which two turbine wheels (13A, 13B) are arranged parallel to each other.

7. A motor brake device according to claim 6, wherein the two turbine wheels (13A, 13B) of the twin flow turbine (13A, 13B) have an exhaust gas channel with varying flow through cross-section.

8. A motor brake device according to claim 6, wherein the respective second closing bodies (34A, 34B) provided respectively in the bypass lines (33A, 33B) of the twin flow turbine (13) are designed to be controllable or adjustable independently of each other.

9. A motor brake device according to claim 1, wherein each high-pressure turbine (13, 13A, 13B) is provided in parallel arrangement with at least one bypass line (33A, 33B) with a respective therein associated second closing body (34A, 34B).

10. A motor brake device according to claim 1, wherein at least one closing body (30, 34A, 34B) is a valve and/or restrictor and/or flap and/or slide valve.

11. A motor brake device according to claim 1, wherein a control device (40) is provided, which provides a control or adjustment signal, via which the first closing body (30) and/or the second closing body (34A, 34B) and/or the flow through restrictor (35) and/or the turbines (13, 16) with variable turbine geometry are adjustable or controllable.

12. A motor brake device according to claim 1, wherein the control device (40) is a component of the motor control unit (ECU), which includes a program controlled unit.

13. A motor brake device according to claim 1, wherein the control or adjusting signal is an electric or pneumatic or hydraulic signal.

14. A motor brake device according to claim 1, wherein at least one of the closing bodies (30, 34A, 34B) or the flow through restrictor (35) is integrated in the housing of the turbocharger (10).

* * * * *